Jan. 21, 1936.  R. C. PIERCE  2,028,165
TIRE AND METHOD OF MAKING THE SAME
Filed July 21, 1934   2 Sheets-Sheet 1
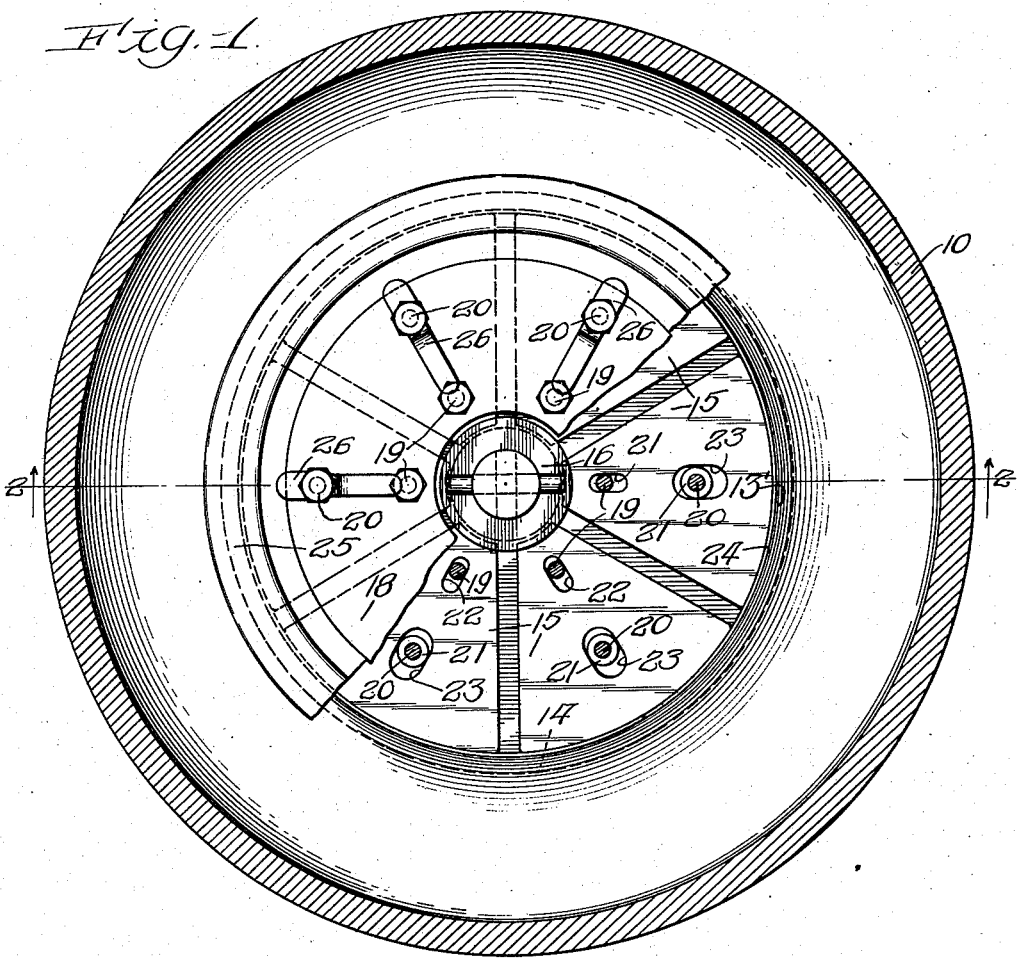
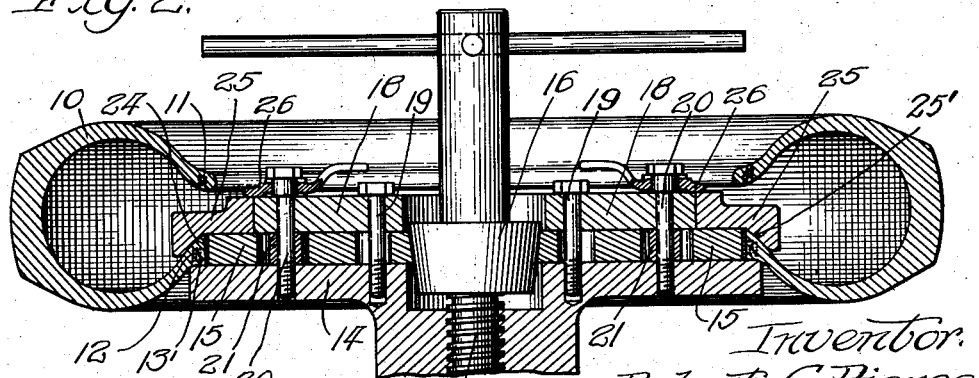
Inventor.
Robert C. Pierce, Jan. 21, 1936.   R. C. PIERCE   2,028,165
TIRE AND METHOD OF MAKING THE SAME
Filed July 21, 1934    2 Sheets-Sheet 2
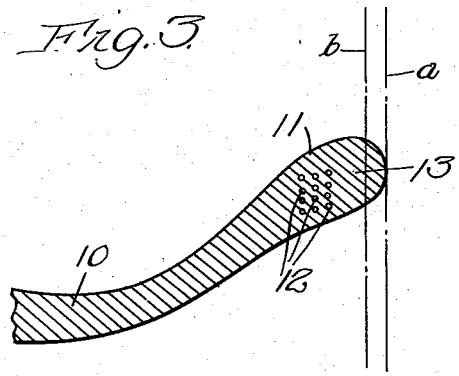
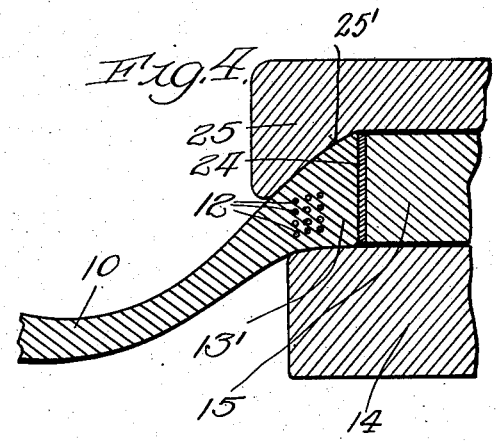
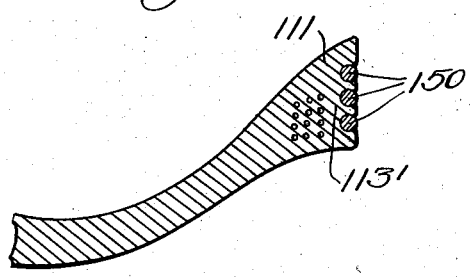
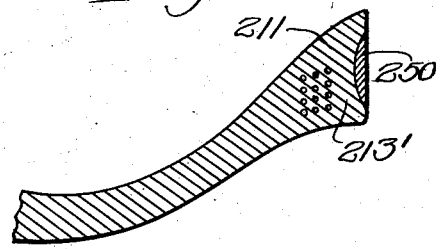
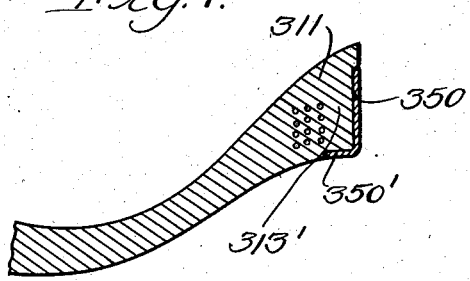
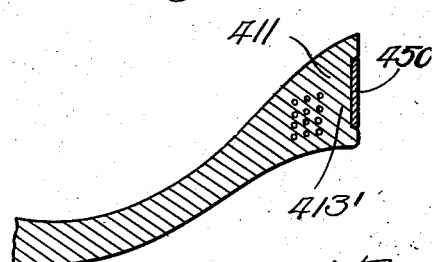
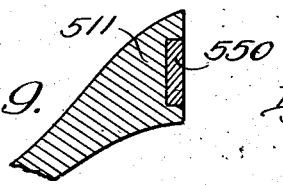

Patented Jan. 21, 1936

2,028,165

UNITED STATES PATENT OFFICE 2,028,165

TIRE AND METHOD OF MAKING THE SAME

Robert C. Pierce, Niles, Mich., assignor to National-Standard Company, Niles, Mich., a corporation of Michigan Application July 21, 1934, Serial No. 736,415

8 Claims. (Cl. 154—14)

This invention relates to tires and the method of making the same and applies, more particularly, to the shoe or outer casing of a pneumatic tire of the type now commonly used on motor vehicles.

In the making of tires of this type, it is customary to place a reinforcement in the bead. This reinforcement usually takes the form of a plurality of wires, a tape woven or braided from plurality of wires, a cable, or the like. In order to give a good fit on the rim, it is desirable to have the tire material in the bead under the reinforcement relatively thin and rather highly compressed. If this is not done, the reinforcement or reinforcing ring in the bead is too far removed from the rim so that the relatively thick material of the bead under the reinforcement compresses further in usage. This results in making the tire loose on the rim.

Among the features of my invention is the provision of means and method for overcoming the objections noted above. Among the features of my invention is the compressing of the bead material under the reinforcement prior to the curing of the tire so that in the completed tire such material under the reinforcement will be relatively thin and rather highly compressed.

Another feature of my invention is the placing of a metal band on the inner side of the bead under the reinforcement. This band may be expanded into the bead before curing and may be caused to adhere to the bead. This will give the compression of the bead material under the reinforcement which it is desirable to have and will also permit the forming of the inner diameter of the bead to an exact dimension. Instead of a flat band, a plurality of relatively large wires may be employed.

Another feature of my invention is the shaping of the bead before curing. This may be done at the same time that the material under the reinforcement is compressed, as explained above, or at the same time that a metal ring is applied to the inner edge of the bead.

I have spoken above of placing a metal band or a plurality of relatively large wires on the inner side of the bead under the reinforcement. I have stated that this band may be expanded into a bead before curing and may be caused to adhere to the bead. That is, the band may be in the form of a ring. If a plurality of relatively large wires are employed, they may constitute a plurality of rings. In placing such a metal band, ring, or plurality of rings in the bead, I prefer to place an undersized metallic ring or rings within the bead and expand such ring or rings enough to stretch the material beyond its elastic limit (but not to the breaking point) so that it is accurately and permanently set in its final size and shape. Since the reinforcement in the bead is substantially inextensible, this stretching of the band or ring on the inner side of the bead simultaneously: (1) sizes and shapes the inner circumference of the bead, (2) compresses the bead material between the band or ring and the bead reinforcement, and if desired, (3) roughly shapes or molds the bead approximately to the desired final cross-sectional shape.

By expanding the bead before curing, as explained above, in order to thin and compress the material of the bead under the reinforcement, and/or by placing a steel band or wires at the inner edge of the bead before curing, it is possible to obtain a much more accurate fit of the completed tire on the rim and the danger of looseness developing in usage is eliminated or lessened.

Another feature of my invention is the use of a metal band, as above described, on the inner side of the bead which also serves as the bead reinforcement, so that there need be no other reinforcement imbedded in the bead.

Other features and advantages of my invention will appear more fully as I proceed with my specification.

In the accompanying drawings, I have shown means for practicing my improved method and have also illustrated my improved tires. As shown in these drawings—

Fig. 1 is a view in side elevation of the apparatus for expanding the bead and/or applying a metal band to the inner surface thereof prior to curing; Fig. 2 is a view taken as indicated by the line 2 of Fig. 1; Fig. 3 is a diagrammatic view showing a section of a bead to illustrate the way that the bead can be expanded and compressed under the reinforcement; Fig. 4 is a similar view showing the bead expanded and formed by the apparatus of Figs. 1 and 2; Fig. 5 is a similar view showing the placing of three wires on the inside of the bead; Fig. 6 is a similar view showing the placing of a metal band in the bead, said band being convex on one side; Fig. 7 is a similar view showing the placing of a metal band in the bead, said band having one edge bent upwardly at right angles; Fig. 8 is a similar view showing a flat metal band applied to the inner surface of the bead; and Fig. 9 is a similar view showing the band used as the reinforcement.

As shown in the drawings, in Figs. 1 to 8, inclusive, the tire is indicated in general by 10 and at the bead thereof in general by 11. I have shown inside of the bead for reinforcement a plurality of wires, in this case twelve wires, and these are indicated by 12, this reference numeral serving to indicate the reinforcement in general, whatever its form may be.

The material of the bead under the reinforcement 12 I have indicated by 13. This is shown in Fig. 3 as it appears after the tire is first formed. That is, it is so thick that it extends below the reinforcement 12 far enough to reach to the reference line a. It is desirable that this material 13 under the reinforcement in the completed tire be expanded and compressed somewhat. For example, it may be desirable to expand and compress this material until it reaches the reference line b. That is, the internal diameter of the bead is preferably increased by a distance equal to twice the distance between the reference lines a and b.

In order to obtain this expansion and compression of this bead material under the reinforcement 12, I have here shown a support 14 carrying six radially movable segmental members 15. These members are adapted to be moved outwardly by the wedge 16 mounted on the screw 17. A plate 18 holds the wedges on the support 14 and this plate, in turn, is held to the support by inner bolts 19 and outer bolts 20. The latter carry spacing members 21 to prevent the wedges 15 from being clamped too tightly to the support 14. The wedges are provided with slots 22 and 23 to accommodate the bolts 19 and the bolts and washers 20, 21.

24 indicates a thin metal band which may be placed over the segments 15 in order to bridge the spaces between the same. A bead of the tire in the form shown in Fig. 3 is placed over the segments 15 and they are then expanded to the position shown in Figs. 2 and 4. This serves to expand and compress the material 13, and in such expanded and compressed state it is indicated by 13'. There is also preferably placed over the outer edges of the segments 15 a bead-forming ring 25 which may be held in position by the locking levers 26 on the bolts 20. When the bead material is expanded and compressed, its inner side surface is also formed by the beveled surface 25' of this member 25.

After each bead has been thus expanded and formed or shaped as shown in Fig. 4, the tire is put in the mold and cured in the usual manner.

The bead besides being formed and expanded prior to curing may also have forced thereinto a plurality of wires, metal band, or the like. I have shown different embodiments of this feature of the invention in Figs. 5 to 8, inclusive. For example, in Fig. 5, the bead 111 has applied to its inner surface the three wires 150. In this embodiment of the invention, the three wires 150 may be wrapped over the steel band 24, with their ends disconnected or loosely enough so that the desired expansion is permitted. The segments 15 are then expanded, as explained above, whereupon the bead material is expanded and compressed to the form indicated by 113' and the wires 150 are at the same time forced and imbedded in the inner edge of the bead.

The construction of Fig. 6 is similar to that shown in Fig. 5, except that instead of the three wires 150, a metal band 250 is used, this band being shown convex on the outside and flat on the inside.

In Fig. 7, in place of the wires 150 or metal band 250, I have shown a flat band 350 having one edge turned outwardly, as indicated by 350'.

In Fig. 8, I have shown a flat metal band 450 applied in a similar manner to the inner edge of the bead 411.

As shown in Figs. 5 to 8 inclusive the bead may have applied to its inner surface three wires 150, a metal band 250, a band 350 with a flange, or a flat metal band 450. Each of the bands 250, 350, or 450 may be an endless band; and each of the wires 150 may be an endless band. Each of these endless bands may be initially somewhat undersize and stretched beyond its elastic limit (but not to the breaking point) as it is forced into the bead. When the band is thus made endless and stretched, three things are simultaneously accomplished, namely: (1) the band is accurately and finally sized and shaped and therefore the inner circumference of the bead is also sized and shaped; (2) the material of the tire bead is compressed between the band and substantially inextensible reinforcement 12 in the bead; and (3) if a bead forming ring 25 is employed, the bead material is molded into the desired cross-sectional shape. In the same manner as just described, the flat metal band 550 to be hereinafter described may also be made endless and undersized and stretched beyond its elastic limit as it is forced into the bead.

In Fig. 9, I have shown a flat metal band 550 applied in a similar manner to the inner edge of the bead 511. Here, however, the band serves as the reinforcement and there is no other reinforcement inside the bead. Consequently, I prefer to make this band somewhat thicker and stronger and also fasten the ends of the same together in any suitable manner, as for example, by welding.

The members 150, 250, 350, and 450 are preferably coated or plated with some substance, for example, antimony, copper or brass, in order to cause them to adhere to the bead material. The substance used for plating may be plated over a coating of zinc or cadmium, which substantially protects the rings against rusting and corrosion. While the stretching of the rings 150, 250, 350, 450, and 550 greatly facilitates accurately sizing and shaping them, some of the advantages of the invention may be obtained by leaving the ends of these members disconnected during the expanding operation and then permanently welding or otherwise securing the ends together.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A tire formed with a bead containing a substantially inextensible reinforcement and having an internal compression-sustaining ring, and having the material of the bead between the reinforcement and the ring held under compression by the reinforcement and the ring.

2. A tire formed with a bead containing a metallic annular reinforcement and having an internal metallic ring, and having the material of the bead between the reinforcement and the ring held under compression by the reinforcement and the ring.

3. A tire formed with a bead having an angular section metal ring secured to its inner circumference and to its outer face adjacent thereto, and having a substantially inextensible reinforcement imbedded in the bead and holding part of the material of the bead compressed against said ring.

4. That method of making a tire which comprises forming the bead of the tire with a substantially inextensible reinforcement therein, placing a metallic ring inside the circumference of the bead, and stretching said ring beyond its elastic limit to compress between the ring and the reinforcement part of the bead material and accurately to predetermine the diameter of the bead, and completing the manufacture of the tire in a manner permanently uniting the bead to said ring.

5. That method of making a tire which comprises forming the bead of the tire with an annular reinforcing therein, and placing a metallic ring inside the circumference of the bead and stretching it to compress between the ring and the reinforcement part of the bead material and accurately to predetermine the diameter of the bead.

6. That method of making a tire which comprises forming the bead of the tire with an annular reinforcement therein, placing a metallic ring inside the circumference of the bead and stretching it to compress between the ring and the reinforcement part of the bead material and accurately to predetermine the diameter of the bead, and molding said bead approximately to its final shape while stretching said ring.

7. That method of making a tire which comprises forming the tire bead with an annular reinforcement therein, placing within the tire a member shaped approximately to the desired final shape of the bead and in a position to hold the bead against outwardly-directed pressure, placing an undersize ring within said bead, and stretching said ring outwardly to final size by outwardly-directed pressure which: (1) compresses the material of the bead between the reinforcement and the ring, (2) accurately sizes and shapes said ring and sets it in the final inside size and curvature of the bead, and (3) molds the bead approximately to shape against said member.

8. That method of making a tire which comprises placing within the tire a member shaped approximately to the desired final shape of the bead and in a position to hold the bead material against outwardly-directed pressure, placing an undersize ring within said bead, and stretching said ring outwardly to final size by outwardly-directed pressure which: (1) compresses the material of the bead, (2) accurately sizes and shapes said ring and sets it in the final inside size and curvature of the bead, and (3) molds the bead approximately to shape against said member.

ROBERT C. PIERCE.